July 23, 1935.  C. GERST  2,009,133
SPEED CHANGE MECHANISM
Filed July 10, 1933
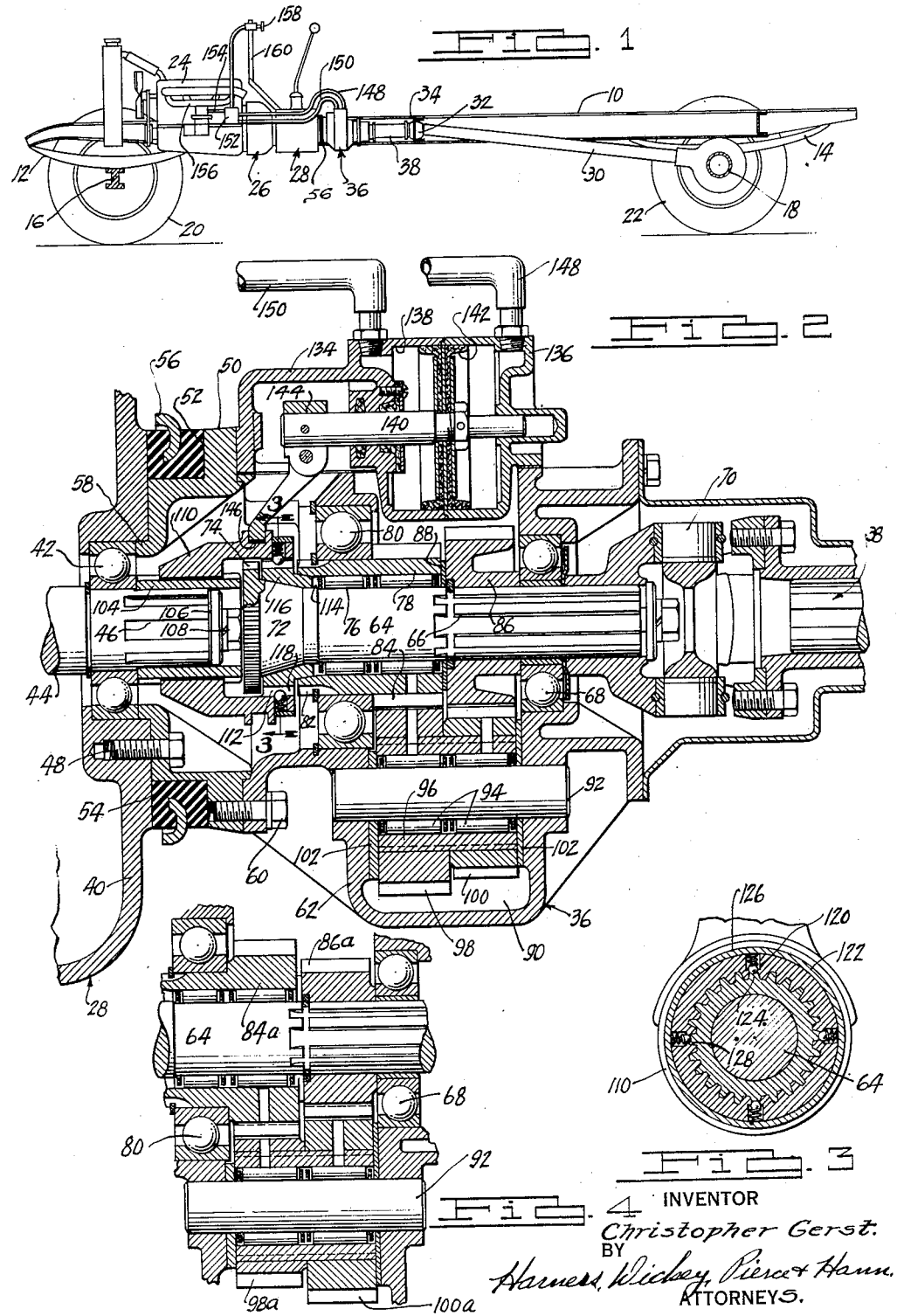
INVENTOR
Christopher Gerst.
BY
Harness, Dickey, Pierce & Hann.
ATTORNEYS.

Patented July 23, 1935

2,009,133

UNITED STATES PATENT OFFICE 2,009,133

SPEED CHANGE MECHANISM

Christopher Gerst, Detroit, Mich.

Application July 10, 1933, Serial No. 679,620

7 Claims. (Cl. 74—369)

This invention relates to speed change mechanism and, while it is applicable to a variety of different uses, it is particularly adaptable for use as a speed change mechanism auxiliary to the usual transmission mechanism of a motor vehicle, the principal object being the provision of a device of this type that is simple in construction, efficient in operation and economical to produce.

Objects of the invention include a speed change mechanism of minimum weight and length and maximum strength; a speed change mechanism adapted for support at one end thereof and so designed as to result in a minimum amount of bending and deflection of the housing relative to the support; a speed change mechanism that is particularly adaptable for use as an auxiliary to the usual transmission of a motor vehicle and which may be employed to effect either an over or under drive for the transmission with a minimum amount of change in the auxiliary speed change mechanism; the provision of a speed change mechanism having ideal bearing conditions with no overhanging gear load, a minimum of bearing spread, and a minimum of bending and deflection of the driven shaft; and a speed change mechanism in which change from one speed to another thereof may be accomplished at any speed without difficulty.

Further objects include the provision of a speed change mechanism capable of producing a direct drive therethrough and either an over or under drive therethrough; the provision of such a change speed mechanism in which the over or under drive includes a pair of gears on the driven shaft and a pair of gears on the counter shaft, each pair of gears being in substantial contact with each other and being supported immediately adjacent either side thereof, whereby any deflection of the gears or their supporting means due to the transmission of power therethrough is substantially eliminated; the provision of a change speed mechanism including a main driven shaft having a pair of gears supported thereon, one of which is fixed for equal rotation with the shaft and one of which is rotatably mounted upon the shaft, the gears being operatively connected through a counter shaft, and selectively operated means for directly driving either the main driven shaft or the rotatable gear; the provision of a change speed mechanism including a housing having a driving shaft projecting into one end thereof and a driven shaft extending from a point adjacent the driving shaft and projected from the opposite end of the casing, the driven shaft having a pair of gears thereon, one of which is fixed for equal rotation with the driven shaft and the other of which is rotatably mounted thereon, the gears being operatively connected together through a counter shaft, and the rotatable gear and the driven shaft having clutch elements located at that end thereof adjacent the driving shaft, and the driving shaft carrying a slidable clutch element selectively engageable with the clutch elements carried by the driven shaft and the rotatable gear; the provision of a novel form of means tending to prevent clashing of the clutch elements during shifting thereof; and the provision of a novel form of fluid pressure shifting mechanism for the shiftable elements of a speed change mechanism including a two part cover for the housing thereof having a pressure operated cylinder formed therebetween.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Figure 1 is a more or less diagrammatic, partially broken, side elevational view of a motor vehicle equipped with a main and auxiliary transmission or speed change mechanism.

Fig. 2 is an enlarged vertical sectional view taken axially through the center of the auxiliary transmission or speed change mechanism shown in Fig. 1.

Fig. 3 is a vertical sectional view taken transversely of the shiftable clutch elements of the mechanism illustrated in Fig. 2 as on the line 3—3 of Fig. 2.

Fig. 4 is a fragmentary vertical sectional view illustrating the manner in which the arrangement of gears in the construction shown in Fig. 2 may be re-arranged to provide an over drive instead of an under drive.

Although the present invention is adaptable to a relatively wide variety of uses in connection with transmitting power between any two desired parts or objects and, accordingly, its use is not to be considered as restricted in any sense of the word, it is particularly adaptable for use as an auxiliary to the usual transmission or speed change mechanism of a motor vehicle and, accordingly, its application to such use is herein shown and described as a manner of illustration only as far as the broader phases of the invention are concerned.

Referring to Fig. 1, a motor vehicle is shown including a chassis frame 10 connected by springs 12 and 14 to axles 16 and 18 respectively to which are secured the usual wheels 20 and 22 respectively. At the forward end of the frame 10 is suitably supported a conventional internal combustion engine 24 having secured to the rear end thereof a clutch including a housing 26 and to which in turn is secured a conventional transmission or speed change mechanism indicated generally at 28. In the particular type of vehicle illustrated, the rear or driving axle 18 is connected by a propeller shaft contained within a torque tube 30 to a universal joint 32 supported by a frame cross member 34 located intermediate the rear axle 18 and the transmission 28, and the universal joint 32 is connected to the transmission 28 through a short propeller shaft not shown. In the present case this short propeller shaft is removed and a speed change mechanism indicated generally in Fig. 1 at 36 is secured directly to the rear face of the transmission 28 and connected by a short shaft 38 with the universal joint 34. Accordingly, in this installation in order to apply it to a vehicle of the construction described, all that is necessary is to remove the usual short propeller shaft between the transmission 28 and universal joint 34 and replace it by the unit including the short shaft 38. This effects a considerable saving in installation cost.

Referring now to Figs. 2 and 3, the transmission 28 is shown as being provided with a rear wall 40 in which is suitably supported as by means of a ball bearing assembly 42 the rear end of the main transmission shaft 44 which projects therebeyond a short distance and is splined as at 46. Secured to the rear face of the wall 40 of the transmission by cap screws 48 is a short ring 50 providing an annular channel 52 between it and the wall 40 in which is received a ring of resilient material 54 in which is embedded the centrally apertured portion of a frame cross member 56 provided for resiliently supporting the rear end of the power unit of the vehicle. The ring 50 is provided with a short pilot portion 58 which is closely received in the opening for the bearing assembly 42 in the wall 40 whereby to accurately locate the ring 50 with respect to the transmission 28.

Suitably centered on the rear face of the ring 50 and secured thereto as by cap screws 60 is the casing 62 for an auxiliary speed change mechanism. Located within the housing 62 in axial alignment with the main transmission shaft 44 is a driven shaft 64 the rear end of which is splined as at 66 and which is rotatably supported in the housing 62 by a ball bearing assembly 68, the rear end of the portion 66 projecting beyond the bearing assembly 68 and being non-rotatably connected to a universal joint 70 in a conventional manner. The universal joint 70 in turn is connected to the shaft 38 extending to the universal joint 34 previously described.

The forward end of the shaft 64 extends up to within a short distance of the rear end of the main transmission shaft 44 and is provided with an outwardly flared frusto-conical surface 72 which terminates at its forward end in a clutch element 74 formed in the shape of a spur gear. Intermediate the portions 72 and 66 of the shaft 64 the surface of the shaft 64 is formed smooth and cylindrical and is surrounded by roller bearings 76, and rotatably supported by the roller bearings 76 is a sleeve 78, the forward end of which is received within a ball bearing assembly 80 suitably supported in the housing 62. The extreme forward end of the sleeve 78 projects forwardly beyond the forward edge of the bearing assembly 80 and is formed to provide a clutch element 82 thereon of the same form and size as the clutch element 74. That portion of the sleeve 78 rearwardly of the bearing assembly 80 is externally formed to provide a gear 84 preferably of the helical type.

The shaft 64 between the rear end of the gear 84 and the bearing assembly 68 has non-rotatably splined thereto a gear 86 also preferably of the helical type and in the present instance of larger diameter than the gear 84. The gears 84 and 86 are separated from each other by a thrust ring 88 but otherwise are in substantial contact with each other. It may also be noted at this point that the bearing assemblies 68 and 80 are separated substantially only by the combined width of the gears 84 and 86 so that any force being transmitted through these gears will have little, if any, effect in causing deflection of either the gears or the shaft 64.

Formed in the housing 62 below the gears 84 and 86 is a pocket 90 through which projects a countershaft 92. Within the pocket 90 and rotatably supported upon the countershaft 92 by means of roller bearings 94 is a sleeve 96 to which is non-rotatably secured gears 98 and 100 which mesh with the gears 84 and 86 respectively. Thrust rings 102 are provided between the gears 98 and 100 and their respective ends in the pocket 90 maintain the axial position of the gears 98 and 100 and to take any axial thrust exerted through them.

An externally splined sleeve 104 is non-rotatably splined to the rear end of the main transmission shaft 44 and is secured against axial movement thereon by a washer 106 and screw 108 in a conventional manner. Non-rotatably mounted upon the sleeve 104 but axially slidable thereon is a shiftable clutch member 110 the rear end of which is formed to provide a clutch element 112 in the form of an internal gear of a size permitting interlocking engagement with either of the clutch elements 74 or 82. In Fig. 2 the clutch element 112 is illustrated as being positioned between the clutch elements 74 and 82 and consequently out of engagement with both of them. Obviously, if the member 110 is shifted forwardly, or to the left as viewed in Fig. 2, this clutch element 112 will be non-rotatably engaged with the clutch element 74 on the shaft 64 and will lock the shaft 64 to the shaft 44 for equal rotation therewith. On the other hand, if the clutch member 110 is shifted rearwardly so as to engage its clutch element 112 with the clutch element 82, the gear 84 will be locked to the shaft 44 for equal rotation therewith and in rotating will transmit power through the gears 98 and 100 to the gear 86 and thence the shaft 64, and with the proportion of gears shown will thus drive the shaft 64 at a lower rate of rotation than the shaft 44. Accordingly, with the arrangement of gears shown in Fig. 2 the auxiliary speed change mechanism provides an under drive for the main transmission 28, this being desirable under certain conditions. The amount of reduction through the drive may, of course, be readily varied by changing the diameters of the gears. If, however, it is desired to provide an over drive through the auxiliary transmission mechanism it may be varied as illustrated in Fig. 4 in which all of the parts shown are identical to those shown in Fig. 2 with the exception that the gear 84a, corresponding to the gear 84 in Fig. 2, is made larger than the gear 86a instead of smaller as in Fig. 2, and the gears 98a and 100a corresponding to the gears 98 and 100 in Fig. 2, are correspondingly changed in diameter for proper meshing relationship with the gears 84a and 86a. In this particular case if the clutch element 112 is intermeshed with the clutch element 82 the main drive shaft 64 will be driven at a higher rate of rotation than the shaft 44, thus providing an over drive which is desirable under certain conditions.

Because of the fact that the clutch elements 74 and 82 are formed in the shape of spur gears and the clutch element 112 is formed in the shape of an internal gear, intermeshing of the clutch element 112 with either the clutch element 74 or 82 may be accomplished at substantially any speed with a minimum amount of clashing. However, under certain conditions it may be desirable to eliminate what little clashing might occur between these parts and, accordingly, I have illustrated in Fig. 2 a preferred method of attaining this end. It will be noted that the forward end of the sleeve 78 is internally provided with a short frusto-conical surface 114 and that between the rear face of the clutch element 74 and the forward face of the clutch element 82 a ring 116 is rotatably positioned on the shaft 64 and is provided with a portion projecting under the surface 114. The inner surface of the ring 116 is tapered into conformity with the frusto-conical surface 72 of the shaft 64 and the rear edge of the ring 116 is externally tapered into conformity with the surface 114. Between the clutch elements 74 and 82 the ring 116 is externally provided with teeth 118 of substantially the same size and shape as those provided on the clutch elements 74 and 82 and the clutch element 112 of the clutch member 110 axially slidably but non-rotatably engages the teeth 118. The clutch element 112 is provided, as best indicated in Fig. 3, with a plurality of radially disposed openings 120 therein, the outer ends of which are closed by a ring 122 surrounding the clutch element 112. At the radially inner ends of each of the openings 120 is positioned a ball 124 and a coil spring 126 is maintained under compression between the ring 122 and each ball 124. Corresponding teeth of the clutch element 112 are centrally provided with a slight depression 128 in which the balls 124 naturally tend to seat. However, considering the parts to be in the position indicated in Fig. 2 and the vehicle in motion, it will be observed that if the clutch member 110 is urged forwardly or to the left so as to place the auxiliary transmission in direct drive position, the balls 124 will tend to carry the ring 116 forwardly with the member 110. This will cause the ring 116 to ride up on the tapered surface 72 of the shaft 64 and tend to lock it thereto for equal rotation and consequently will tend to cause the clutch member 110 and shaft 44 to rotate at the same speed as the shaft 64. As the pressure tending to shift the clutch member 110 is increased it will finally cause the balls 124 to be forced out of their corresponding depressions 128 and will permit the clutch member 110 and clutch element 112 to move forwardly until the clutch member 112 is intermeshed with the clutch member 74 but, due to the fact that the clutch member 110 will have now been brought up to or substantially to the same speed as the shaft 64, engagement of these elements will occur with a minimum amount of clashing.

Considering the clutch elements 112 and 74 to be engaged as above described and considering it now desirable to shift the mechanism into under drive position, the clutch member 110 is urged rearwardly or to the right as viewed in Fig. 2 first causing the clutch member 112 to be withdrawn from engagement with the clutch member 74 and then permitting the balls 124 to again drop into their seats 128. After this occurs and as the clutch member 110 is continued to be urged rearwardly, the tapered rear surface of the ring 116 will first be engaged with the complementary tapered surface 114 on the sleeve 78, thus tending to lock the ring 116 to the sleeve 78 for equal rotation therewith in the same manner as previously described in connection with shifting of the clutch members to direct drive position, and as the pressure on the clutch member 110 is increased the balls 124 will again be forced out of their corresponding depressions 128 and the clutch element 112 will be moved into interengagement with clutch element 82 with a minimum amount of clashing.

This synchronizing mechanism for the clutches is particularly desirable where the movable clutch element of the change speed mechanism is shifted pneumatically as in the case of the construction shown. This pneumatic shifting mechanism will now be described. The casing 62 is provided with a transversely split cover including a forward section 134 and a rear section 136 and between which is centrally formed a cylinder 138. An axially shiftable shaft 140 is suitably supported by the sections 134 and 136 at opposite ends of the cylinder 138 and within the cylinder has fixed thereto a piston 142. The forward end of the shaft 140 has fixed thereto a shifting yoke 144, the yoked end of which is received in an annular groove 146 formed in the periphery of the shiftable clutch member 110. Suitable tubes 148 and 150 connect opposite ends of the cylinder 138 with a valve mechanism indicated generally as at 152 in Fig. 1 and which in turn is connected by a tube 154 with the intake manifold 156 of the engine 24. The valve mechanism 152 may be controlled by a button 158 on the dash 160 of the vehicle so as to optionally connect either the tube 148 or 150 with the suction existing within the manifold 156 and the other tube with the atmosphere so as to cause the piston 142 and the shaft 140 together with the shifter yoke 144 to be shifted either forwardly or rearwardly to move the auxiliary transmission to either direct or under drive position.

With the above described construction it will be apparent that the speed change mechanism is of a minimum length, this being partially attained by reason of the fact that the gears 84 and 86 and the gears 98 and 100 are located substantially in contact with each other. Furthermore, because of the fact that the speed change mechanism is so short, the lever arm of the torque reaction caused by tooth loads will result in a minimum amount of bending and deflection of the housing of the auxiliary transmission. Furthermore, it will be noted that in this construction ideal bearing conditions are present in that there are no overhanging gear loads, a minimum bearing spread, and a minimum bending and deflection of the driven shaft will occur. Also in the particular embodiment shown the same may be installed in a vehicle of the specific type described in a minimum amount of time and at a minimum amount of expense.

Although but substantially one specific embodiment of the invention has been shown and illustrated, it will be obvious that the construction is adapted to a relatively wide variety of uses other than the specific application shown and is capable of various modifications and changes and, accordingly, formal changes may be made in the specific embodiment of the invention shown without departing from the substance or spirit of the broad invention, the scope of which is commensurate with the appended claims.

I claim:

1. In a speed change mechanism, in combination, a casing, a pair of independently rotatable shafts arranged in end to end relationship within said casing, a clutch element fixed to one of said shafts on that end thereof adjacent the other of said shafts, a gear rotatable about said one of said shafts, bearing means interposed between said gear and said casing, a clutch element fixed against rotation with respect to said gear, said clutch elements being located in spaced but adjacent relationship, a clutch element fixed against rotation with respect to said other of said shafts but slidable axially thereof and movable to a position between the first two mentioned clutch elements and out of engagement with both thereof or to a position in engagement with either one thereof, a second gear on said one of said shafts fixed against rotation thereon, and gears connecting the two first mentioned gears.

2. In a speed change mechanism, in combination, a casing, independently rotatable driving and driven shafts arranged in end to end relationship within said casing, a clutch element fixed to that end of said driven shaft nearest said driving shaft, a gear rotatably surrounding said driven shaft, anti-friction means between said gear and said driven shaft, anti-friction means between said gear and said casing, a clutch element fixed to said gear and lying in adjacent relationship with respect to the first mentioned clutch element, a clutch member slidably but non-rotatably mounted on said driving shaft having a clutch element selectively engageable with either of the two first mentioned clutch elements, a second gear fixed to said driven shaft, and a pair of gears fixed relative to each other and meshing with the two first mentioned gears.

3. In a speed change mechanism, in combination, a driving and a driven shaft lying in end to end relationship and rotatable independently of one another, a clutch element fixed to that end of said driven shaft nearest said driving shaft, a gear rotatably surrounding said driven shaft, a clutch element fixed to said gear in spaced but adjacent relationship with respect to the first mentioned clutch element, said driven shaft and said gear having cone surfaces formed thereon adjacent their respective clutch elements, a ring rotatably surrounding said driven shaft between said clutch elements and having cone surfaces complementary to and engageable with the two first mentioned cone surfaces, a clutch element slidable relative to said driving shaft but fixed against rotation relative thereto, the last mentioned clutch element being selectively engageable with either of the two first mentioned clutch elements, yieldable means tending to urge said ring toward equal sliding movement with said last mentioned clutch element, a second gear on said driven shaft, and gearing connecting the two first mentioned gears.

4. In a speed change mechanism, in combination, a driving and a driven shaft lying in end to end relationship and rotatable independently of one another, a clutch element fixed to that end of said driven shaft nearest said driving shaft, a gear rotatably surrounding said driven shaft, a clutch element fixed to said gear in spaced but adjacent relationship with respect to the first mentioned clutch element, said driven shaft and said gear having cone surfaces formed thereon adjacent their respective clutch elements, a ring rotatably surrounding said driven shaft between said clutch elements and having cone surfaces complementary to and engageable with the two first mentioned cone surfaces, teeth formed on said ring, a clutch element slidable relative to said driving shaft but fixed against rotation relative thereto, the last mentioned clutch element being selectively engageable with either of the two first mentioned clutch elements and non-rotatably engaging said teeth on said ring, yieldable means tending to urge said ring toward equal sliding movement with said last mentioned clutch element whereby to cause engagement of one of the cone surfaces on said ring with one of the two first mentioned cone surfaces, a second gear on said driven shaft, and gearing connecting the two first mentioned gears.

5. In combination, a rotatable shaft element having a clutch element fixed thereto and a conical surface adjacent said element, a gear element rotatable about said shaft having a clutch element fixed thereto and a conical surface in spaced but adjacent relation with respect to the first mentioned clutch element and conical surface respectively, a ring rotatable about said shaft between said clutch elements and having conical surfaces complementary to and engageable with the two first mentioned conical surfaces, a clutch element engageable with either of the two first mentioned clutch elements and shiftable therebetween having relatively non-rotatable engagement with said ring, and yieldable means acting between the third mentioned clutch element and said ring urging them toward equal axial movement.

6. In a speed change mechanism, in combination, a casing, a driven shaft therein, a clutch element fixed to one end of said shaft, a gear rotatable about said shaft, anti-friction means between said shaft and gear, a clutch element fixed with respect to said gear, a second gear fixed to said shaft in approximately contacting relation with respect to the first mentioned gear, bearing means for said first mentioned gear and said shaft carried by said casing in approximate contact with the more remote sides of said gears, gearing connecting said gears, and a clutch element fixed against rotation with respect to said driven shaft selectively engageable with either of the two first mentioned clutch elements.

7. In a speed change mechanism, in combination, a casing, a shaft therein, a gear rotatable about said shaft, said shaft having bearing in said gear, a clutch element fixed to an end of said shaft, a sleeve fixed to said gear and projecting toward said clutch element, a clutch element fixed to the end of said sleeve more remote from said gear, a bearing surrounding said sleeve between said gear and said clutch element thereon and supported by said casing, a second gear fixed to said shaft in approximate contact with the first mentioned gear, a bearing surrounding said shaft in approximately contacting relation with respect to said second mentioned gear and supported by said casing, gearing connecting said gears, a driving shaft, and clutching means carried by said driving shaft selectively engageable with either of the two first mentioned clutch elements.

CHRISTOPHER GERST.